UNITED STATES PATENT OFFICE.

WILLIAM JAMES MORRISON AND JOHN CRIDDLE WHARTON, OF NASHVILLE, TENNESSEE.

METHOD OF PURIFYING WATER.

SPECIFICATION forming part of Letters Patent No. 354,650, dated December 21, 1886.

Application filed December 10, 1885. Serial No. 185,263. (Specimens.)

*To all whom it may concern:*

Be it known that we, WILLIAM JAMES MORRISON and JOHN CRIDDLE WHARTON, both of Nashville, in the county of Davidson and State of Tennessee, have invented certain new and useful Improvements in Methods of Clarifying and Purifying Water, of which the following is a full, clear, and exact description.

This invention consists in certain compounds in the form of powders for clarifying and purifying water, the same consisting of two powders which are to be used in succession, substantially as hereinafter described. The one of these powders which is first used, and which we shall designate "powder No. 1," is composed of a mixture or mixtures of any suitable alkali or alkaline earths with sand or other ponderous inert granulated or pulverized material—such as marble-dust, tripoli, &c.—said inert material serving, when the powder is mixed with the water to be treated, to give weight to the precipitate for the purpose of carrying it down more speedily than it otherwise would settle, and also serving to prevent the powder from agglomerating into lumps. The other powder, which is afterward used, and which we designate "powder No. 2," is composed of a combination of any salt or salts capable of forming a constituent of an "alum"—such as aluminic, ferric, manganic, &c., salts—and any manganic or permanganic salts capable of yielding oxygen readily—and any ponderous inert granulated or pulverized material—such as sand, marble-dust, tripoli, &c.—said inert material having the same effect in this powder as in powder No. 1. The object of these compounds is to cause a chemical reaction in the water to be clarified and purified, by first stirring in a portion of powder No. 1, and then following up the treatment by introducing or stirring in said water a like or other suitable quantity of powder No. 2. The result, supposing common alum is used in powder No. 2, will be to precipitate aluminum hydrate, and this collecting the floating or suspended matter in the water carries it down to the bottom of the vessel containing the water, the gravitating power of the sand or other inert ponderous material in the mixture or mixtures aiding this result.

We do not confine ourselves to any precise proportions of the ingredients used, so long as the chemical equivalents of the reacting powders are not materially affected. Thus a greater proportion of sand or other ponderous inert material than hereinafter specified may be used, if desired, without producing any material difference in the results; and instead of lime, as hereinafter described, being used in powder No. 1, such alkali as soda, potash, &c., or a mixture of alkalies and alkaline earths, may be used. A like qualification applies to powder No. 2. Thus there are numerous alums that may be used—as, for instance, common alum, which contains sulphate of alumina, and ferric alums, which contain ferric sulphate. We have found, however, the following ingredients, in or about the proportions specified, and following mode of preparing the same and powders which they compose, to be practically efficient. Thus, in preparing powder No. 1, we have taken of quicklime about one (1) bushel and poured on it about one (1) gallon of hot water. While the lime was slaking we have added about two (2) gallons of a solution of caustic soda of about 30° Baumé, and then finished slaking with sufficient water to enable us to produce a fine powder, which we sifted through a fine sieve, and to each pound of this powder added five (5) pounds (more or less) of finely-sifted sand; or the whole mixture was made first and the sifting done afterward. The powder thus made we then put up in packages and labeled "No. 1."

In preparing powder No. 2 we have taken, say, sixty (60) pounds (more or less) of pulverized or finely-granulated alum, (of commerce,) and sifted the same to break up any adherent lumps that there might be. To this we have added one hundred (100) pounds (more or less) of fine sand properly sifted, and from one thousand (1,000) to fifteen hundred (1,500) grains, or thereabout, of powdered permanganate of potassium, and subsequently mixed the whole all well together, and put up in packages and labeled "Powder No. 2."

We have used these powders in clarifying and purifying water, by first stirring into the water a small proportion of powder No. 1, say about one (1) tea-spoonful to about five (5) or seven (7) gallons of water, and then added and stirred in about the same quantity of powder No. 2, and allowed the water to stand till the precipitation was completed.

The compounds may be used even in connection with a filter, as it is a well-settled fact that no filter, by passing water through it, will remove all the organic matter which may be present, nor is it absolutely known that filters will remove the germs of certain diseases—such as cholera, yellow fever, &c.—when present in drinking-water, nor is the mere clearness of the water any proof of its purity. The clarifying and purifying powders, however, we have here described accomplish the desired result, and if, in addition, in case of an epidemic, the water treated by these powders be subsequently boiled, the possibility of there being any such germs of disease remaining will be removed. The invention is also applicable to all waters used for domestic purposes generally, as likewise in the preparation of various beverages; also for steam boilers, laundry and bathing purposes.

If desired, the manganic or permanganic salts may be omitted from powder No. 2 and be embodied instead in powder No. 1, or they may be embodied in both powders. Furthermore, if thought proper, the sand or other ponderous inert material may be stirred in the water used in the preparation of the powders, either before or after the other ingredients are added, and be used in either of the powders, which we have designated "Nos. 1 and 2."

Having thus described our invention, we claim as new and desire to secure by Letters Patent—

1. The method herein described of clarifying and purifying water, consisting in first adding to the water an alkali mixed with an inert ponderous material, and then adding an alum salt mixed with an inert ponderous material, as set forth.

2. The method herein described of clarifying and purifying water, consisting in first adding to the water a mixture of lime, soda, and sand, and then a mixture of alum, permanganate of potassium, and sand, as specified.

WILLIAM JAMES MORRISON.
JOHN CRIDDLE WHARTON.

Witnesses:
WM. H. WHARTON,
A. D. GARRETT.